United States Patent Office 3,264,233
Patented August 2, 1966

3,264,233
POLYURETHANES FROM HALOGENATED BRANCH POLYETHERS
Viktor Trescher, Leverkusen, Gunther Braun, Cologne-Flittard, and Manfred Dahm, Leverkusen, Germany, assignors to Farbenfabriken Bayer Aktiengesellschaft, Leverkusen, Germany, a German corporation
No Drawing. Filed Mar. 20, 1963, Ser. No. 266,513
Claims priority, application Germany, Mar. 31, 1962, F 36,435
8 Claims. (Cl. 260—2.5)

This invention relates to polyurethane plastics and more particularly to polyurethane plastics which contain halogen atoms and urethane groups and which may, in some cases, be foamed plastics.

The production of high molecular weight plastics, in some cases foamed plastics, based on linear or branched hydroxyl group-containing polyalkylene glycol ethers, polyisocyanates and, if desired, also wetting agents, is already known. Moreover, it is known that reaction components containing halogen and/or phosphorus atoms may be used for the purpose of reducing the inflammability. Sometimes, in the making of the heretofore known polyurethane plastics flame resistant, the physical properties have been greatly impaired.

It is therefore an object of this invention to provide improved polyurethane plastics based on polyhydric polyhydric polyalkylene ethers which contain chemically combined halogen atoms. Another object of this invention is to provide polyurethane plastics having reduced inflammability. Still, a further object of this invention is to provide cellular polyurethane plastics having both excellent physical properties and reduced inflammability. Another object of this invention is to provide cellular polyurethane plastics with good dimensional stability which have reduced inflammability.

The foregoing objects and others which will become apparent from the following description are accomplished in accordance with the invention, generally speaking, by providing polyurethane plastics prepared by a process which comprises reacting an organic polyisocyanate with a polyhydric polyalkylene ether which contains at least one —O—R—(X)$_n$ groups, wherein R is an alkylene or arylene radical; X is chlorine, bromine or iodine and $n$ is an integer. Thus, it has now been found that valuable cross-linked and, in some cases, foamed plastics may be obtained if the linear or branched hydroxyl group containing polyhydric polyalkylene ether is used as a starting material which has the alkylene groups at least partially substituted by oxyalkylene or oxyarylene halogen bearing groups.

These starting materials used in accordance with the invention are prepared by known methods, for example, by reacting a linear or branched alkylene oxide addition product containing halogenoalkyl substituents with halogenated alcohols or phenols in the presence of an alkali. Phenols in this connection included also multinuclear aromatic hydroxyl compounds, for example, halogen-containing naphthols and hydroxydiphenyls. It is not necessary for the halogen atom to be bound to the aromatic nucleus but may be in a substituent on the nucleus. It is preferable to use halogenated alcohols and phenols containing one hydroxyl group. It is, of course, possible to use compounds containing several hydroxyl groups if this is desirable for obtaining particular properties in the finished plastic.

Preferred examples of linear or branched alkylene oxide addition products with halogenoalkyl substituents are polyhydric polyalkylene ethers in which the alkylene part consists partly or entirely of halogen-containing alkylene radicals, preferably epichlorohydrin. Individual examples of halogenated alcohols or phenols of the above type are trichloroethyl alcohol, dibromoallyl alcohol, mono-, di-, tri-, tetra-, and penta-chlorophenol and trichloro hydroxy diphenyl.

Another method of preparing the starting materials according to the invention comprises forming polyaddition products of glycidyl ethers of halogenated aliphatic or aromatic hydroxyl compounds as defined above, alone or mixed with various alkylene oxides or their mixtures, e.g., ethylene oxide, propylene-1,2-oxide, butylene-1,2- and/or 1,3-oxide, butylene-2,3-oxide, epichlorohydrin, styrene oxide or cyclohexene oxide, or the like, with one or more hydroxyl group-containing starting molecules, preferably diols and triols in addition to higher alcohols and phosphoric acid. Particular examples are: ethylene glycol, propylene-1,2- and 1,3-glycol, butylene- 1,3- and -1,4-glycol, trimethylol propane, glycerol, pentaerythritol, sorbitol and phosphoric acid. Glycidyl ethers of the above-mentioned type include, for example, the glycidyl ether of pentachlorophenol, of mono- or poly-halogenated hydroxydiphenyl, 3,3-dibromoallyloxypropylene oxide and the like. The polyaddition is carried out in the presence of acid or alkaline catalysts, for example, sulphuric acid, phosphoric acid, p-toluenesulphonic acid, boron fluoride, boron fluoride etherate, potassium hydroxide, sodium hydroxide, potassium carbonate, sodium carbonate and the like.

Another variation of this method comprises using glycidyl ethers containing one or more unsaturated groups which are capable of subsequent halogenation, preferably with chlorine or bromine, for example, 3-allyloxypropylene oxide.

The above described starting materials to be used in accordance with the invention may be used either alone or mixed with any other suitable organic compound containing active hydrogen containing groups as determined by the Zerewitinoff method, such as polyhydric polyalkylene ethers, hydroxyl polyesters, other known polyhydroxyl compounds preferably with linear or branched polyethers, polyesters, polythioethers, polyacetals and the like.

Any suitable hydroxyl polyester may be used such as are obtained for example, from polycarboxylic acids and polyhydric alcohols. Any suitable polycarboxylic acid may be used such as, for example, oxalic acid, malonic acid, succinic acid, glutaric acid, adipic acid, pimelic acid, suberic acid, azelaic acid, sebacic acid, brassylic acid, thapsic acid, maleic acid, fumaric acid, glutaconic acid, alpha-hydromuconic acid, beta-hydromuconic acid, alpha-butyl-alpha-ethyl-glutaric acid, alpha-beta-diethyl-succinic acid, isophthalic acid, terephthalic acid, hemimellitic acid, trimellitic acid, trimesic acid, mellophanic acid, prehnitic acid, pyromellitic acid, benzenepentacarboxylic acid, 1,4-cyclohexanedicarboxylic acid, 3,4,9,10-perylenetetracarboxylic acid and the like. Any suitable polyhydric alcohol may be used such as, for example ethylene glycol, 1,3-propylene glycol, 1,2-propylene glycol, 1,4-butylene glycol, 1,3-butylene glycol, 1,2-butylene glycol, 1,5-pentane diol, 1,4-pentane diol, 1,3-pentane diol, 1,6-hexane diol, 1,7-heptane diol, glycerine, trimethylol propane, 1,3,6-hexanetriol, triethanolamine, pentaerythritol, sorbitol and the like.

Any suitable polyhydric polyalkylene ether may be used such as, for example, the condensation product of an alkylene oxide or of an alkylene oxide with a polyhydric alcohol. Any suitable polyhydric alcohol may be used such as those disclosed above for use in the preparation of the hydroxyl polyesters. Any suitable alkylene oxide may be used such as, for example, ethylene oxide, propylene oxide, butylene oxide, amylene oxide and the like. Of course, the polyhydric polyalkylene ethers can be prepared from other starting materials such as, for example tetrahydrofuran, epihalohydrins such as, for example epichlorohydrin and the like, as well as aralkylene oxides such as, for example, styrene oxide, and the like. The polyhydric polyalkylene ethers may have either primary or secondary hydroxyl groups and preferably are polyhydric polyalkylene ethers prepared from alkylene oxides having from two to five carbon atoms such as, for example, polyethylene ether glycols, polypropylene ether glycols, polybutylene ether glycols and the like. It is often advantageous to employ some trihydric or higher polyhydric alcohol such as glycerine, trimethylol propane, pentaerythritol, sorbitol, 1,2,6-hexane triol, alpha-methyl-d-glucoside and the like in the preparation of the polyhydric polyalkylene ethers so that some branching exists in the product. Generally speaking, it is advantageous to condense from about 5 to about 30 mols of alkylene oxide per functional group of the trihydric or higher polyhydric alcohol. The polyhydric polyalkylene ethers may be prepared by any known process such as, for example, the process disclosed by Wurtz in 1859 and in Encyclopedia of Chemical Technology, vol. 7, pp. 257–262, published by Interscience Publishers Inc. (1951) or in U.S. Patent 1,922,459.

Any suitable polyhydric polythioether may be used such as, for example, the condensation product of thiodiglycol or the reaction product of a polyhydric alcohol such as is disclosed above for the preparation of the hydroxyl polyesters with any other suitable thioether glycol. Other suitable polyhydric polythioethers are disclosed in U.S. Patents 2,862,972 and 2,900,368.

The hydroxyl polyester may also be a polyester amide such as is obtained, for example, by including some amine or amino alcohol in the reactants for the preparation of the polyesters. Thus, polyester amides may be obtained by condensing an amino alcohol such as ethanolamine with the polycarboxylic acids set forth above or they may be made using the same components that make up the hydroxyl polyester with only a portion of the components being a diamine such as ethylene diamine and the like.

Any suitable polyacetal may be used, such as, for example, the reaction product of formaldehyde or other suitable aldehyde with a polyhydric alcohol such as those disclosed above for use in the preparation of the hydroxyl polyesters.

Any suitable organic polyisocyanate may be used, including aliphatic, cycloaliphatic, alkaryl, aralkyl, heterocyclic and aryl polyisocyanates, such as, for example, diisocyanates, and particularly there may be used tetramethylene diisocyanate, pentamethylene diisocyanate, octamethylene diisocyanate, dodecamethylene diisocyanate, 3,3'-diisocyanato dipropyl ether, xylylene diisocyanates, para, para'-diphenylmethane diisocyanate, beta, beta'-diphenyl propane-4,4'-diisocyanate, and the like. Other examples are meta-phenylene diisocyanate, para-phenylene diisocyanate, 1-methyl phenylene-2,4-diisocyanate, naphthylene-1,4-diisocyanate, naphthylene-1,5-diisocyanate, 2,6-toluylene diisocyanate, 1,3,5-benzene triisocyanate, para, para', para"-triphenylmethane triisocyanate, and the like. Also, the addition products of polyisocyanates with deficient quantity of a low molecular weight alcohol, such as, 1,4-butane diol, glycerine, trimethylolpropane, the hexane diols and hexane triols and addition products of the aforementioned polyisocyanates with low molecular weight polyesters, such as castor oil, may also be used. Also suitable are the isocyanate polymers described in German specifications Nos. 1,022,789 and 1,027,394. Mixtures of organic isocyanates may also be employed.

One may also use biuret polyisocyanates of the general formula:

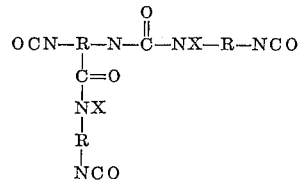

in which R is an aliphatic, hydroaromatic, araliphatic including aralkyl or an aromatic radical, which may or may not be substituted with halogen, such as, chlorine, NO$_2$, an alkyl radical such as methyl, ethyl; an alkoxy radical, methoxy, ethoxy or the like. R should not contain any hydrogen atoms which are reactive with an —NCO group. X is either hydrogen or the grouping —CO—NX—R—NCO in which X has the same meaning. The polyisocyanates having the biuret structure may be prepared by reacting in a neutral solution water with a monomeric organic diisocyanate in the ratio of 1 mol water to 3 mols diisocyanate or by reacting a monomeric organic diisocyanate with urea diisocyanate of the formula:

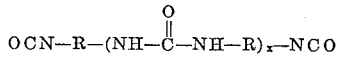

in which R is an aliphatic, hydroaromatic, araliphatic or an aromatic radical, which may or may not be substituted with halogen, such as, chlorine, an NO$_2$ group, an alkyl radical, such as methyl, ethyl; and alkoxy radical, such as methoxy, ethoxy or the like, and $x$ is from 1 to 5.

Any suitable crude isocyanate may be used, such as, for example, crude toluylene diisocyanates obtained by the phosgenation of a mixture of toluylene diamines or crude diphenyl methane isocyanates obtained by the phosgenation of crude diphenyl methane diamine. Crude diphenyl methane diamine is the reaction product of aniline and formaldehyde in the presence of HCl and contains some tri- and higher polyamines. A preferred unrefined or crude isocyanate is one having from about 26 to about 33 percent free —NCO and an amine equivalent of about 120 to about 150, such as, for example, a product having about 32 percent free —NCO and an amine equivalent of about 140. A specific crude isocyanate suitable for use in accordance with the present invention may be obtained by reacting about 60 parts of aniline with about 25 parts of formaldehyde (37 percent aqueous) and about 74 parts of HCl (30 percent aqueous) at a temperature of about 90° C. to about 100° C. for about 1.5 to about 2 hours and then reacting this product with NaOH and separating out the crude amine. About 100 parts of phosgene are then reacted with the crude amine until a product having an amine equivalent of about 135 and containing about 31 percent free —NCO is obtained. The free excess phosgene and substantially all of the solvents used, if any, are then removed. When toluylene diisocyanates, for example, are produced by conventional phosgenation of the corresponding diamines, a product containing about 90 percent 2,4- and 2,6-toluylene diisocyanate and the balance a crude residue of imidazoles and the like resulting in the phosgenation is obtained from the phosgenator. This product may also be used. It is preferred to phosgenate a mixture of ortho- and para-toluylene diamines. A specific product is the undistilled reaction mixture obtained by the phosgenation of 80 percent 2,4- and 20 percent 2,6-toluylene diamine containing 90 percent of a mixture of about 80 percent 2,4- and 20 percent 2,6-toluylene diisocyanate and the balance polymers incapable of accurate analysis.

The commercially available crude 4,4'-diphenyl methane diisocyanate having an assay of 90 percent maximum, an amine equivalent of 141 maximum, about 0.04 to about 0.4 percent by weight hydrolyzable chloride, about 0.1 to about 0.6 percent by weight total chloride and having a flash point of about 430° F. may be used. As pointed out above, when toluylene diisocyanate, is produced by conventional phosgenation of the corresponding diamine, a product containing about 90 percent 2,4- and 2,6-toluylene diisocyanate is obtained from the phosgenator. Of course, the product from the phosgenator is subjected to distillation to remove the solvent so that a product having 90 percent of 2,4- and 2,6-toluylene diisocyanate is obtained. The initial product from the phosgenator in most cases contains about 80 percent by weight of solvent. The 2,4- and 2,6-toluylene diisocyanate may be mixed with any suitable amount of the residue obtained if the isocyanate is refined and then reconstituted. In this event, it is preferred to have at least 50 percent of the refined isocyanate present. The crude polyisocyanates disclosed in U.S. Patent 2,950,307 are suitable.

The reaction of the above mentioned halogen-containing polyether with organic polyisocyanates by the isocyanate-polyaddition process and, in some cases, additional cross-linking agents is carried out practically without modification according to the known processes and gives rise, for example, to high quality foam plastic. Materials having the elasticity of rubber, lacquers, and adhesives and coating materials may also be prepared by this process.

The preparation of the polyurethane plastics of the invention and preferably the cellular polyurethane plastics is carried out in the manner well known in the art by a rapid and thorough mixing of the organic polyisocyanate with the polyhydric polyalkylene ether containing polymerizates preferably in the presence of water and other blowing agents to prepare a polyurethane plastic and preferably a cellular polyurethane plastic. It is preferred in the production of the polyurethane plastics to include an activator such as a tertiary amine or an organo metallic compound. Any suitable tertiary amine may be used such as, for example, dimethyl benzyl amine, N-methyl-N'(N-dimethyl amino ethyl) piperazine, triethylene diamine, permethylated diethylene triamine and the like. Any suitable organo metallic compound may be used such as those disclosed in U.S. Patent 2,846,408. It is preferred to use organo tin compounds such as, for example, dibutyl tin dilaurate, dibutyl tin di-2-ethyl hexoate, stannous octoate, stannous oleate and the like. It is preferred to use a foam stabilizer for the production of the cellular polyurethane plastics such as, for example, sulphonated castor oils and sodium salts thereof. Where polyhydric polyalkylene ethers are included in the reaction mixture to prepare a cellular polyurethane plastic, it is preferred to employ a silicone oil such as that disclosed in U.S. Patent 2,834,748 within the scope of the formula

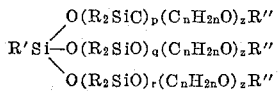

wherein R, R' and R" are alkyl radicals having 1 to 4 carbon atoms; $p$, $q$, and $r$ each have a value of from 4 to 8 and $(C_nH_{2n}O)_z$ is a mixed polyoxyethylene oxypropylene group containing from 15 to 19 oxyethylene units and from 11 to 15 oxypropylene units with $z$ equal to from about 26 to about 34. Most preferred is a compound having the formula

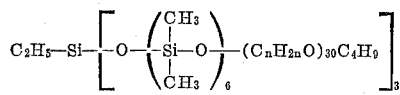

wherein $(C_nH_{2n}O)$ is a mixed polyoxyethylene and oxypropylene block copolymer containing about 17 oxyethylene units and about 13 oxypropylene units.

The coating compositions of the invention are prepared by mixing the polyisocyanate with the polyhydric polyalkylene ether containing polymerizate in an inert organic solvent, such as, benzene, xylene, and the like.

The cellular polyurethanes of the invention are useful for the production of both sound and thermal insulation, cushions such as automobile seat topper pads and the like. The coatings may be used to coat wood, metal and the like. The most important advantage is the noticeable improvement in the mechanical properties of the cellular polyurethane plastics. The mechanical properties which are most improved are tensile strength, elongation, compression strength, impact elasticity and residual compressive deformation. These properties are improved independent of the density of the cellular polyurethane plastic and are due solely to this modification. The rubber-like materials may be prepared either by a casting process wherein an excess of the organic polyisocyanate is first reacted with the modified polyhydric polyalkylene ether and then the resulting isocyanato terminated prepolymer is reacted with a cross-linking agent, 1,4-butane diol, the bis(beta hydroxyethyl ether) of hydroquinone, or through intermediate stages which may be stored.

It is already known that non-inflammable plastics may be prepared by the isocyanate polyaddition process by incorporating the flame-resistant component, usually comprising a halogen or phosphorus atom, into the polyhydroxyl compound, because this is the only method whereby slow evaporation thereof may be avoided. The use of this principle, as described, for example, in German patent specification No. 1,106,489 is particularly suitable for the production of rigid foam plastics. This invention makes it possible to obtain soft foam plastics having excellent flame-resistance, even without the addition of further flame-resistant agents. In addition, flame-resistant rigid foams having particularly high resistance to heat distortion at elevated temperatures and good impact strength may be prepared.

Another remarkable property of the halogen-containing condensation products used in accordance with the invention is that when they are mixed with other hydroxyl group-containing polyethers or polyesters, they produce excellent flame-resistance even when present in relatively low proportions, preferably about 10 to 20 percent by weight, without impairing the physical properties of the plastics, especially foam plastics. Moreover, if a suitable mixture is prepared, one and the same compound may be used to render flame-resistant for example to both polyester foam plastics and polyether foam plastics, because the described halogen-containing polyethers may be mixed in any proportions with polyesters and polyethers containing hydroxyl groups. This provides a simplified method of storing the raw materials.

The invention is further illustrated by the following examples in which parts are by weight unless otherwise indicated.

*Example 1*

*Production of the starting material.*—(a) About 800 grams of phosphoric acid (85%) and about 260 grams of phosphorus pentoxide are stirred at about 60° C. to about 70° C. until a homogeneous syrupy liquid is produced. About 2680 grams of 3-allyloxypropylene oxide are added dropwise into the mixture, which is at a reaction temperature of about 50° C. to about 60° C., in the course of about 9 hours, and the mixture is cooled at the same time. The reaction is then allowed to continue for another hour at this temperature, and volatile constituents are thereafter removed in vacuo (16 mm. Hg). The temperature is at the same time raised to about 90° C. The reaction product is diluted with about 2500 ml. carbon tetrachloride, cooled to about 20° C., and about 1570 grams of bromine are added dropwise in the course of about 6.5 hours while cooling. Residues of unreacted bromine and traces of hydrogen bromide are then removed from the reaction product by blowing nitrogen through it for about 2 hours. The product has the following properties:

Acid number _____ 157
Viscosity, 100%/75° _____cp__ 553
Phenyl isocyanate consumption/100 g. _____g__ 64.6

(b) About 47 parts of the starting material are thoroughly stirred with about 23 parts of a mixture of higher polyethylene glycols, mainly tri-, tetra- and penta-ethylene glycol (OH content about 17.1%), about 30 parts of a propoxylated trimethlol propane (OH number about 380), about 2 parts of permethylated aminoethyl piperazine, about 0.2 part of dibutyl tin dilaurate, about 0.3 part of polysiloxane polyalkylene glycol ester having the formula

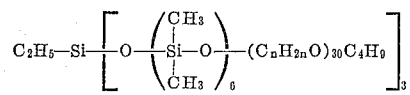

wherein $(C_nH_{2n}O)$ is a mixed polyoxyethylene and oxypropylene block copolymer containing about 17 oxyethylene units and about 13 oxypropylene units, and about 6 parts of sodium castor oil sulphate (about 50% water). After the addition of about 132 parts of diphenyl methane-4,4'-diisocyanate (90%) the mixture is poured into molds in which a difficult combustible tough rigid foam plastic having the following physical properties is produced:

Density, kg./m.$^3$ _____ 30
Compression strength, kg./cm.$^2$ _____ 1.6
Impact strength, kg./cm. _____ 0.5
Resistance to bending on heating, ° C. _____ 118
Uptake of water, percent _____ 2.4

*Example 2*

About 67.2 parts of the starting materials of Example 1 (a) are thoroughly mixed with about 32.8 parts of a mixture of higher polyethylene glycols, namely tri-, tetra- and penta-ethylene glycols (OH content about 17.1%), about 2 parts of permethylated aminoethyl piperazine, about 0.2 part of dibutyl tin dilaurate and about 2 parts of sodium castor oil sulphate (about 50% water). After stirring about 99 parts of diphenyl methane-4,4'-diisocyanate 90%) into the mixture, it begins to foam and a flame-resistant, finely porous rigid foam plastic having the following mechanical properties is obtained:

Density, kg./m.$^3$ _____ 51
Compression strength, kg./cm.$^2$ _____ 1.8
Impact strength, kg./cm. _____ 1.5
Resistance to bending on heating, ° C. _____ 115
Uptake of water, percent _____ 2.7

*Example 3*

*Production of the starting material.*—(a) About 670 grams of molten trimethylol propane are reacted at about 60° C. with about 12.5 grams of boron fluoride etherate and about 1385 grams of epichlorohydrin are added dropwise into the starting medium in the course of about 3 hours at about 50° C. to about 60° C. About 1330 grams of pentachlorophenol are then added at this temperature, and about 160 grams of approximately 50% sodium hydroxide are added in the course of about 30 minutes. With the product at a temperature of about 112° C., the mixture is then boiled for about 3 hours under reflux, and when the reaction is completed the product is washed several times with 2 liter portions of water until the washings are approximately neutral. The moist product is dewatered in vacuo (12 mm. Hg) at a temperature of about 120° C. The reaction product has a chlorine content of about 40.8%, and an —OH content of about 7.0% and an acid number of about 53.

(b) About 50 parts of starting material of Example 3 (a) and about 50 parts of propoxylated trimethylol propane (OH number about 380) are stirred with about 2 parts of n-ethyl morpholine, about 2 parts of permethylated diethylene triamine, about 0.5 part of polysiloxane polyalkylene glycol ester of Example 1 (b) and about 30 parts of trichloro fluoro methane. After addition of about 85 parts of diphenyl methane-4,4'-diisocyanate (90%), the mixture is poured into molds in which a tough rigid foam plastic with the following properties is produced:

Density, kg./m.$^3$ _____ 33
Compression strength, kg./cm.$^2$ _____ 1.8
Impact strength, kg./cm. _____ 0.6
Resistance to bending on heating, ° C. _____ 95
Uptake of water, percent _____ 2.8

*Example 4*

About 20.2 parts of the starting material obtained in Example 1 (a) are thoroughly stirred with about 9.8 parts of a mixture of higher polyethylene glycols, namely tri-, tetra-, and penta-ethylene glycol (OH content about 17.1%), about 35 parts of a propoxylated trimethylol propane (OH number about 380), about 21 parts of a polyester of trimethylol propane, oleic acid, adipic acid and phthalic acid anhydride (OH number about 375; acid number about 0.8) and about 14 parts of a propoxylated ethylene diamine (OH number about 760), about 2 parts of permethylated aminoethyl piperazine, about 0.3 part of the polysiloxane polyalkylene glycol ester of Example 1 (b) and about 6 parts of sodium castor oil sulphate (about 50% water). After addition of about 149 parts of diphenyl methane-4,4'-diisocyanate (about 90%) the mixture begins to foam. A flame-resistant foam plastic having particularly high resistance to bending on heating and the following mechanical properties is obtained:

Density, kg./m.$^3$ _____ 43
Compression strength, kg./cm.$^2$ _____ 1.5
Impact strength, kg./cm. _____ 0.3
Resistance to bending on heating, ° C. _____ 155
Uptake of water, percent _____ 4.3

*Example 5*

*Production of the starting material.*—(a) About 161.5 grams of trimethylol propane and about 11.9 grams of propylene-1,2-glycol are first melted to give a homogeneous mixture and about 72.0 grams of potassium hydroxide (about 86%) are then dissolved in it at about 70° C. The reaction vessel is blanketed with nitrogen, the starting components are heated to about 100° C., and a mixture of about 6051 grams of propylene oxide and about 1172 grams of 3-allyloxypropylene oxide are pumped in the course of about 12 hours. When addition is complete, the reaction is allowed to continue for about one hour at about 100° C., the mixture is then cooled to about 30° C. to about 40° C., a solution of about 47 grams of sulphuric acid (about 96%) in about 750 ml. water is then added and the neutralization of the catalyst is promoted by intensive stirring. The water is then removed by distillation and the polyether is dried in vacuo (12 to 14 mm. Hg) at about 100° C., to about 120° C. The filtered product is then diluted with about 4300 ml. carbon tetrachloride. About 1820 grams of bromine are then added dropwise into this solution over the course of about 8 hours at a temperature of about 20° C. to about 30° C. The reaction is allowed to continue for about one hour and traces of bromine and hydrogen bromide are removed by passing nitrogen through for about 2 hours. The solvent is then removed, finally in vacuo (12 to 14 mm. Hg) at about 50° C. About 7485 grams of polyether having a phenyl isocyanate consumption of about 17.2 grams per approximately 100 g. viscosity (about 100%) of about 155 cp./75° C., an acid number of about 20 and a bromine content of about 19.8%, are obtained.

(b) About 100 parts of the starting material of Example 5 (a) are mixed with about 0.30 part of endoethylene piperazine, about 0.1 part of dibutyl-tin dilaurate, about 1.0 part of a water-soluble polysiloxane-polyalkylene glycol ester of Example 1 (b), about 2.6 parts of water, about 38 parts of a mixture 80% 2,4- and 20% 2,6-toluylene diisocyanate. The elastic foam plastic produced from the liquid reaction mixture has very good flame-resistant properties, is finely porous and has good physical properties.

*Example 6*

About 10 parts of the starting material obtained in Example 5 (a) are mixed with about 90 parts of a polyether with an hydroxyl number about 56, which represents a mixture of about 50 parts of linear polypropylene ether glycol (OH number about 56, molecular weight about 2000) and about 50 parts of a condensation product of propylene oxide and trimethylol propane having an OH number of about 56 and a molecular weight of about 3000, about 0.6 part of endoethylene piperazine, 1.6 parts of stannous octoate, about 2.0 parts of the water-soluble polysiloxane and polyalkylene glycol ester of Example 1 (b), 2.6 parts of water and about 36 parts of a mixture 80% 2,4- and 20% 2,6-toluylene diisocyanate. The foam plastic obtained from the liquid reaction mixture has very good flame-resistance and the following other properties:

Density, kg./m.$^3$ _____ 38
Tensile strength, kg./cm.$^2$ _____ 1.0
Elongation at break, percent _____ 225
Upsetting hardness (at 40% compression), g./cm.$^2$ __ 36
Pressure deformation residue (22 hours
  70° C.), percent _____ 10
Impact elasticity, percent _____ 36

Since the foregoing working examples are given for the purpose of illustration, it is to be understood that any other suitable organic polyisocyanate, polyhydric polyalkylene ether, containing at least one halogenated oxyalkylene or oxyarylene side chain, catalyst, or the like, may be used provided that the teachings of this disclosure are followed.

Although the invention has been described in considerable detail in the foregoing, it is to be understood that such detail is solely for the purpose of illustration and that many variations can be made by those skilled in the art without departing from the spirit and scope of the invention except as set forth in the claims.

What is claimed is:

1. A polyurethane plastic prepared by a process which comprises reacting an organic polyisocyanate with a polyhydric polyalkylene ether containing at least one $$-O-R-(X)_n$$

group as a branch chain substituent on an alkylene group of said polyhydric polyalkylene ether, wherein R is a member selected from the group consisting of arylene and alkylene, X is a member selected from the group consisting of bromine, chlorine and iodine, and $n$ is a positive integer.

2. A cellular polyurethane plastic prepared by a process which comprises reacting in the presence of a blowing agent an organic polyisocyanate with a polyhydric polyalkylene ether containing at least one $-O-R-(X)_n$ group as a branch chain substituent on an alkylene group of said polyhydric polyalkylene ether, wherein R is a member selected from the group consisting of arylene and alkylene, X is a member selected from the group consisting of bromine, chlorine and iodine, and $n$ is a positive integer.

3. The cellular polyurethane plastic of claim 2 wherein said polyhydric polyalkylene ether contains branched chains having the formula: $-O-phenyl-(Cl)_n$, wherein $n$ is 1 to 5.

4. The cellular polyurethane plastic of claim 2 wherein said reaction is carried out in the presence of a tertiary amine catalyst.

5. The cellular polyurethane plastic of claim 2 wherein said reaction is carried out in the presence of an organo tin catalyst.

6. A cellular polyurethane plastic prepared by a process which comprises reacting, in the presence of a blowing agent, an organic compound containing at least two active hydrogen containing groups as determined by the Zerewitinoff method and from about 10 to about 20% by weight, based on the weight of said organic compound containing active hydrogen containing groups, of a polyhydric polyalkylene ether containing at least one $$-O-R-(X)_n$$

group as a branch chain substituent on an alkylene group of said polyhydric polyalkylene ether, wherein R is a member selected from the group consisting of arylene and alkylene, X is a member selected from the group consisting of bromine, chlorine and iodine and $n$ is a positive integer.

7. The cellular polyurethane plastic of claim 6 wherein said organic compound containing active hydrogen containing groups is a propylene oxide condensate and said polyhydric polyalkylene ether containing $-O-R-(X)_n$ groups is the condensation product of a phosphoric acid with 3-allyloxypropylene oxide which is subsequently reacted with chlorine, bromine or iodine.

8. The cellular polyurethane plastic of claim 6 wherein said reaction is carried out in the presence of a silicone oil having the formula:

$$R'Si{\begin{matrix}O(R_2SiO)_p(C_nH_{2n}O)_zR''\\O(R_2SiO)_q(C_nH_{2n}O)_zR''\\O(R_2SiO)_r(C_nH_{2n}O)_zR''\end{matrix}}$$

wherein R, R' and R'' are alkyl radicals having 1 to 4 carbon atoms; $p$, $q$ and $r$ each have a value of from 4 to 8 and $(C_nH_{2n}O)_z$ is a mixed polyoxyethylene oxypropylene group containing from 15 to 19 oxyethylene units and from 11 to 15 oxypropylene units with $z$ equal to from about 26 to about 34 and an organo tin catalyst.

References Cited by the Examiner

UNITED STATES PATENTS 3,060,137 10/1962 Gemeinhardt et al. __ 260—2.5
3,076,784  2/1963 Schulte-Huerman et al. 260—77.5
3,190,926  6/1965 Edwards _____ 260—615

LEON J. BERCOVITZ, *Primary Examiner.*

DONALD E. CZAJA, *Examiner.*

J. J. KLOCKO, *Assistant Examiner.*